United States Patent [19]

Shiozawa et al.

[11] Patent Number: 4,978,589
[45] Date of Patent: Dec. 18, 1990

[54] FUEL CELL

[75] Inventors: Shoji Shiozawa, Yokohama; Toru Shimizu, Urawa, both of Japan

[73] Assignee: Ishikawajima-Harima Heavy Industries Co., Ltd., Tokyo, Japan

[21] Appl. No.: 406,919

[22] Filed: Sep. 12, 1989

[51] Int. Cl.⁵ ............................................. H01M 8/04
[52] U.S. Cl. ...................................................... 429/26
[58] Field of Search .......................................... 429/26

[56] References Cited

U.S. PATENT DOCUMENTS

| | | | |
|---|---|---|---|
| 3,321,334 | 5/1967 | Palmer | 429/26 |
| 4,407,904 | 10/1983 | Uozumi et al. | 429/26 |
| 4,670,359 | 6/1987 | Beshty et al. | 429/26 X |
| 4,769,298 | 9/1988 | Hosaka | 429/26 X |

Primary Examiner—Stephen J. Kalafut
Attorney, Agent, or Firm—R. A. Blackstone, Jr.

[57] ABSTRACT

A conventional fuel cell comprises a plurality of cell elements stacked via separator plates, each cell element comprising an electrolyte plate, and cathode and an anode which sandwich the electrolyte plate. A power generation part of the fuel cell is defined by the electrolyte plate, cathode and an anode. Oxidizing gas and fuel gas are supplied to each cell element in the same direction but the direction is opposite the gas flow of an adjacent cell element. In the improvement, preheating devices are provided next to the power generation part as a part of the fuel cell in the direction gases flow, in a manner such that both incoming and outgoing gases pass through the preheating device. The preheating device includes a plurality of heat exchange promoting elements in the form of projections provided on both faces of the separator plate.

8 Claims, 4 Drawing Sheets

FUEL CELL

BACKGROUND OF THE INVENTION

1. Technical Field

The present invention relates to a fuel cell that directly converts chemical energy to electrical energy.

2. Background Art

Various types of fuel cells are known in the art. Among those, a molten carbonate type fuel cell comprises, as shown in FIG. 4 of the accompanying drawings, a plurality of fuel cell elements, each of which elements comprises an electrolyte plate (title) 1, and a cathode electrode (oxide electrode) 2 and an anode electrode (fuel electrode) 3. The title 1 is a molten carbonate-containing porous plate, and is interposed between the cathode and anode electrodes 2 and 3. The fuel cell elements are stacked via separators 4. Oxidizing gas OG is supplied to the cathode electrode 2 and fuel gas FG is supplied to the anode electrode 3, and power generation results from an electrical potential difference between the cathode 2 and the anode electrodes 3.

In the fuel cell, each title 1, cathode electrode 2 and anode electrode 2 generate heat respectively. Therefore, in order to secure proper functioning of the fuel cell, it is necessary to maintain the temperature of the tile 1 within a certain range, and to render the temperature distribution of the entire fuel cell as constant as possible.

In the conventional fuel cell, to this end, as shown in FIG. 5, the oxidizing gas OG and the fuel gas FG are supplied parallel to each other in the same direction in each cell element while being supplied in the opposite direction relative to the adjacent fuel cell elements. In other words, the fuel gas FG and the oxidizing gas OG that are respectively supplied into one fuel cell along the lower and the upper faces of the tile 1 flow in the same direction (upper two arrows FG and OG in FIG. 5), while the other pair of fuel gas FG and oxidizing gas OG (lower two arrows FG and OG in FIG. 5) supplied into the next fuel cell element flow in the opposite direction.

The reversal of the gas directions are believed effective in suppressing the maximum temperature of the electrolyte 1. However, as depicted in FIG. 6, the temperature at the exit is still high. In FIG. 6, a curve A represents a temperature of the cathode gas, B represents that of the anode gas, C represents that of the cell element, the vertical axis indicates temperature and the horizontal axis indicates a distance ratio from one end of the passage to the other end thereof, i.e., 0 represents the entrance/exit and 1 the exit/entrance. On the other hand, the gas has to be hot at the entrance in order to ensure chemical reactions taking place afterwards. Referring to FIG. 4, preheated hot gas is supplied to the supple passage in order to ensure the reaction in the fuel cell element, and accordingly the hot gas is discharged into the discharge passage. High temperature gases make it impossible to use iron pipes in piping. The fuel cell also requires a preheating device for heating the gas to be supplied to the supply passage. The conventional fuel cell has these shortcomings since that exchange between a manifold portion of the fuel cell and the electrodes is out of concern in designating a fuel cell.

SUMMARY OF THE INVENTION

One object of the present invention is to provide a fuel cell which does not require an external preheating device and in which the gas temperature in the supply passage and the discharge passage are both low as compared with the prior art fuel cell, that results in a simpler design in piping and an improved sealing between the fuel cell and the external pipings thereto.

According to one aspect of the present invention, there is provided a fuel cell including a plurality of fuel cell elements of anode electrodes, titles and cathode electrodes with separator plates being interposed between the fuel cell elements, the cathode gas and anode gas being supplied in the same direction in one cell element but supplied in the opposite direction in a next cell element, characterized in that preheating devices (also called "preheating part") are provided next to the stack of the fuel cell elements in the width direction of the stack. The preheating device comprises heat exchange promoting elements provided on those part of the upper and lower faces of each separator that do not face the cathode and anode electrodes. In this specification, the stack of fuel cell elements is called a power generation part of the fuel cell, and the preheating parts are provided at the lateral sides of the power generation part in a manner such that the gases supplied/discharged to/from the power generation part pass through the preheating parts before they reach/leave the power generation part.

In the fuel cell, the exit of the oxidizing gas of one cell element is formed just next to the entrance of the fuel gas of the adjacent cell element, and the oxidizing gas serves as cooling gas. Therefore, the oxidizing gas is supplied in a larger amount than the fuel gas. Meantime, heat exchang promoting elements are provided on both faces of the separator plates near the entrance and the exit of the gas passages on the separator plates. In each passage, gas temperature is high at the exit. Therefore, the incoming oxidizing gas of one cell element is heated by the outgoing fuel gas of the next cell element near the entrance of the oxidizing gas passage (or the exit of the fuel gas passage) due to the heat exchange promoting elements. Also, since the cell elements are stacked, said incoming oxidizing gas is further heated by the outgoing oxidizing gas via said outgoing fuel gas. When the oxidizing gas is supplied in a large amount, heat exchange mainly takes place between each adjacent two streams of oxidizing gas.

Similarly, near the exit of the oxidizing gas passage of one cell element, heat is transmitted from the hot oxidizing gas to the cold fuel gas via the separator plate, thereby lowering the oxidizing gas temperature while raising the fuel gas temperature. In summary, the gases supplied are heated before they reach the power generation part of the fuel cell, whereas the gases discharged are cooled before they are expelled. Since the temperature of the gases is kept relatively low through the passages, the designing of the fuel cell is simplified, e.g., the pipiing material does not have to be super-heat resisting material and therefore iron pipes may be employed. Also, since heat exchange elements are provided within the fuel cell, an external heat exchange device is not required. Further, sealing of the fuel cell is improved because of lower temperature thereof.

BRIEF DESCRIPTON OF THE DRAWINGS

DESCRIPTION OF THE PREFERRED EMBODIMENTS

Now, preferred embodiments of the present invention will be explained with the accompanying drawings.

Figure 1:
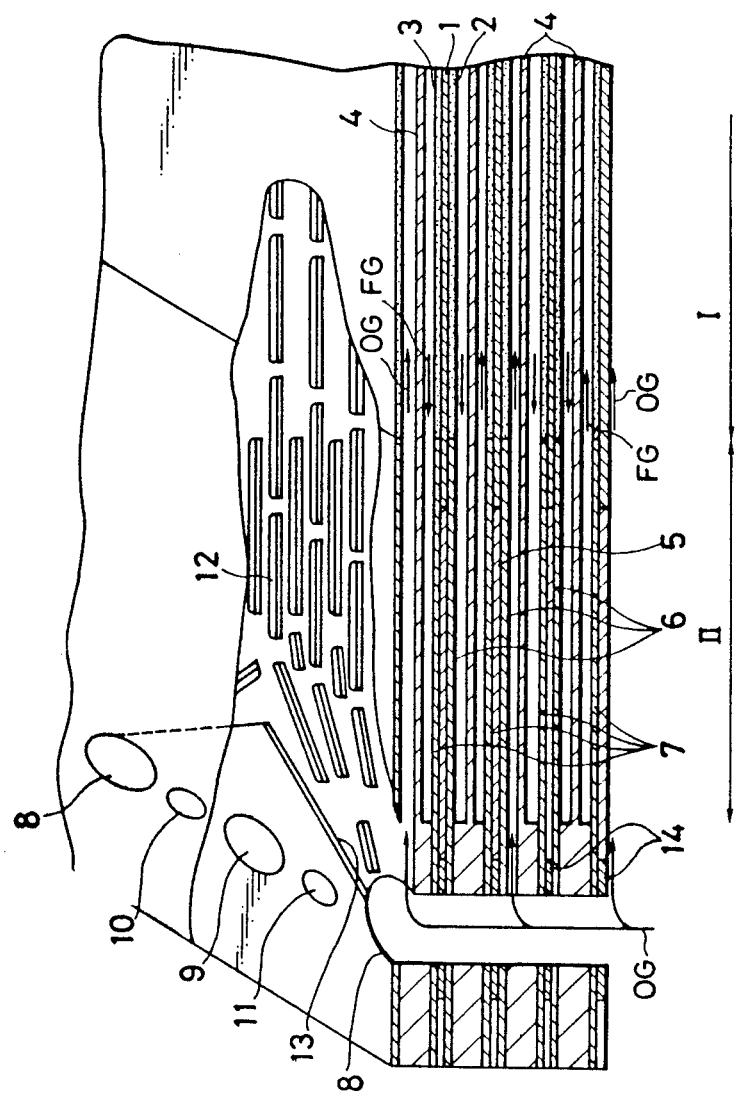
FIG. 1 is a sectional view showing a fuel cell according to the present invention.
Figure 2:
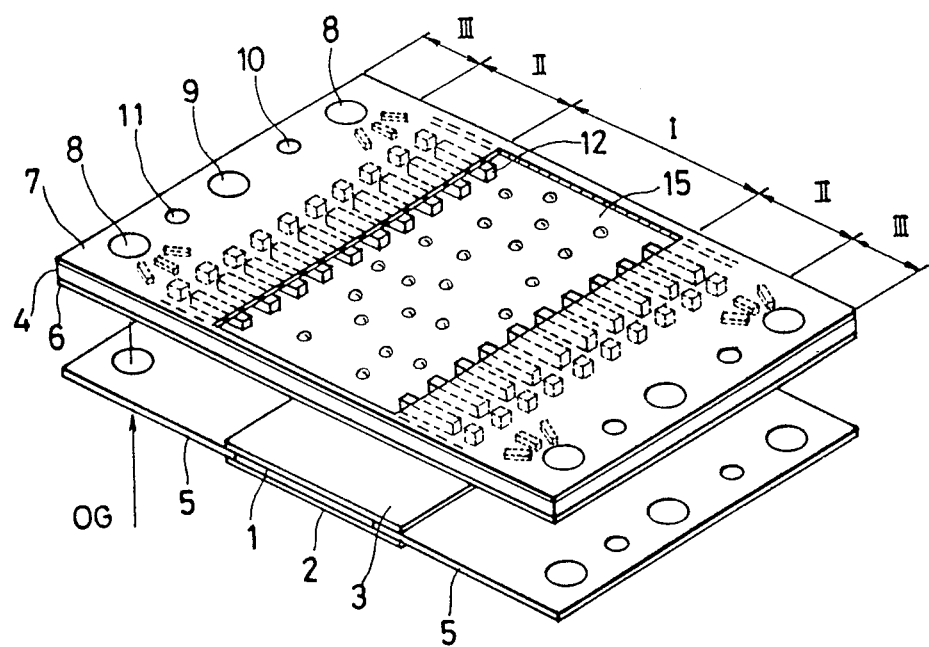
FIG. 2 is a partially enlarged view of FIG. 1.

Referring to FIGS. 1 and 2, each fuel cell element comprises a plate of electrolyte 1, a cathode electrode 2 and an anode electrode 3. An upper and lower faces of the electrolyte plate 1 are sandwiched by the cathode electrode 2 and the anode electrode 3. The electrolyte plate is a molten carbonate-soaked porous plate in this particular embodiment. A plurality of cell elements are stacked one after another via separator plates 4. Each separator plate has convexo-concave portion or projections on both faces thereof. Oxidizing gas OG is supplied to the cathode elctrode 2 while fuel gas FG is supplied to the anode elctrode 3. A power generation part of a fuel cell is defined by the electrlyte 1, the cathode 2 and the anode electrode 3. An insulator 5 such as alumina fiber or molten salt is coplanarly provided next to the electrolyte 1 of each cell element. Cover plates 6 and 7 are provided next to the cathode elctrode 2 and the anode elctrode 3 respectively in the same planes or in the direction the gases flow so that they are coplanar to the cathode and anode electrodes. The cover plates 6 and 7 are fixed on the separators 4 at the convex portion of the separator plate 4. These cover plates 6 and 7 define apertures 15 respectively, as shown in FIG. 2, in which the cathode 2 and the anode 3 are fitted respectively as the fuel cell elements are stacked. Gas passges 8 and 10, and 9 and 11 for supplying/discharging the oxidizing gas OG and the fuel gas FG, which are called a mainfold part, are bored at the periphery of the cover plates 6 and 7. Heat exchange promoting elements 12 are spacedly provided on both faces of the separator plate 4 between the manifold part IV and the power generation part I in a manner such that the gases flow dispersing as they pass therethrough. The heat exchange promoting elements 12 are defined by a plurality of convex elements whose pitch is smaller than the projections of the separator plate which define the gas passages. The convex elements 12 contact the cover plates 6 and 7, so that they also serve as spacer means. Those part of the fuel cell that the heat exchange promoting elements 12 cover form preheating part II of the fuel cell. The preheating parts II formed on the upper and the lower faces of one separator plate communicate with corresponding passages respectively via cutouts 13. While the oxidizing gas OG is guided to the cathode 3 of each cell element and discharged from the exit, heat exchange occurs at the entrance and the exit. Numeral 14 designates a packing, such as an asbestos, for the manifold at the periphery of the insulator member 5.

FIG. 1 illustrates the fuel cell when the oxidizing gas OG is being supplied to the cathode electrode 2. The oxidizing gas supply passage 8 extends vertically and communicates with the passage defined on the upper face of the separator plate due to the cutoff 13. In other words, only the oxidizing gas OG through the passage 8 can flow on the upper face of the separator plate 4.

The oxidizing gas OG and the fuel gas FG flow in parallel to each other and are respectively heated when they pass the power generation part I of the fuel cell. Since the preheating parts II are provided at both lateral sides of the fuel cell, sandwiching the power generation part I, heat is exchanged between the high temperature fuel gas FG and low temperature oxidizing gas at the entrance of the oxidizing gas passage due to a number of heat exchange promoting elements 12 provided on both faces of the separator plate 4 in the preheating part II, even though each pair of oxidizing gas and fuel gas flow in opposite directions in adjacent fuel cell elements. Therefore, the hot outgoing fuel gas FG is cooled in the preheating part II and discharged while the cool incoming oxidizing gas OG is heated and led to the power generation part I.

At the exit of the oxidizing gas passage, the high temperature oxidizing gas OG is introduced from the power generation part I to the preheating part II. The low temperature fuel gas flowing next to the oxidizing gas via the separator plate 4 is heated in the preheating part II due to heat from the oxidizing gas and led to the power generation part I. The oxidizing gas is thus cooled and discharged.

Figure 3:
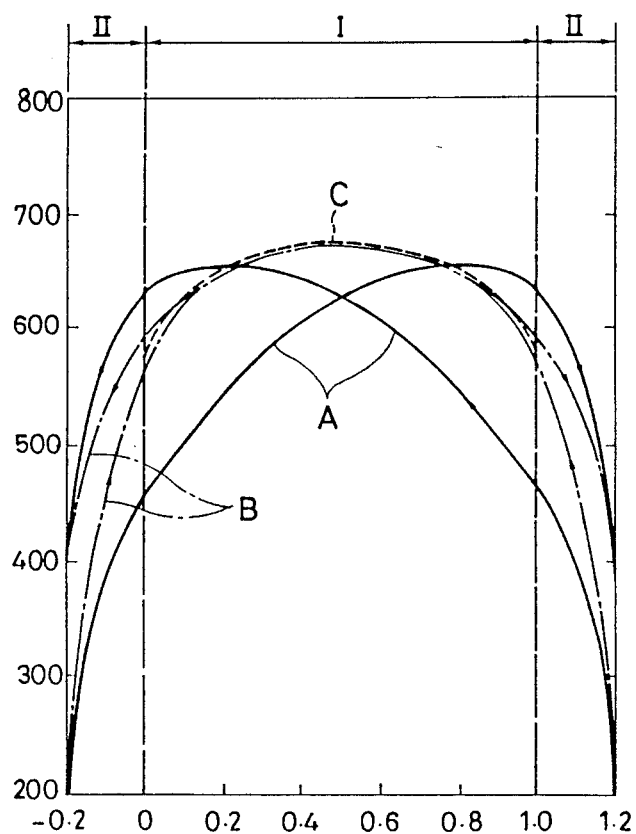
FIG. 3 is a graph showing a temperature distribution in the fuel cell according to the present invention.
Figure 4:
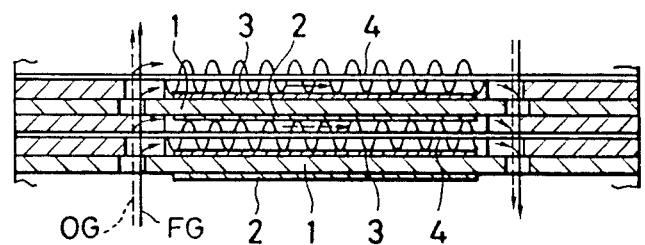
FIG. 4 illustrates a sectional view of a fuel cell according to the prior art.
Figure 5:
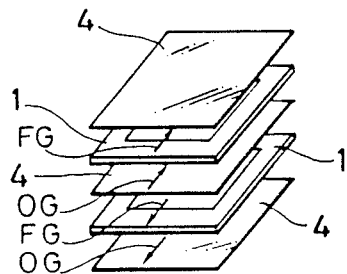
FIG. 5 is a graph showing a temperature distribution in the fuel cell according to the prior art.
Figure 6:
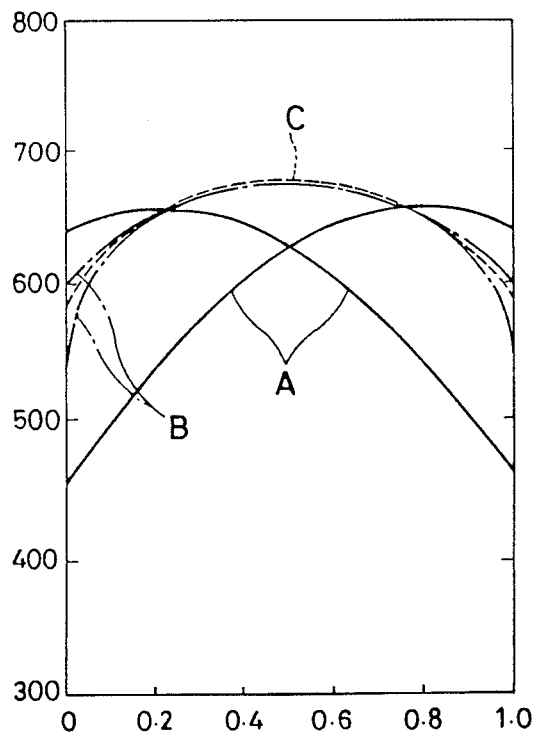
FIG. 6 is a graph showing a temperature distribution in the fuel cell of FIG. 5.

Temperature distributions in each cell element along the direction the gas flows are shown in FIG. 3. As seen in a left quarter of FIG. 3, the incoming cathode gas A is heateed by the outgoing anode gas B and further heated by the outgoing cathode gas A in the preheating part II. This shows that the heat exchange between the gases takes place inside the fuel cell. Therefore, the gas to be supplied to the fuel cell does not have to be heated beforehand, and lower temperature gas can be supplied to the fuel cell from outside, compared with the conventional fuel cell illustrated in FIG. 6. Also, the temperature of outgoing gas is lowerer than in the conventional fuel cell. Therefore, the material of the pipes for supplying/discharging does not require high heat resistance. Moreover, a separate preheating device is not required in the gas supply line.

The present invention is not limited to the above embodiments, and various modifications can be made without departing the spirit and scope of the present invention. For instance, the separator plate 4 may be a corrugated plate or a plate having split type fins. Also, the insulator member 5 does not have to be provided.

We claim:

1. A fuel cell comprising a plurality of fuel cell elements stacked via separator plates, each cell element comprising an electrolyte plate, cathode and an anode, the electrolyte plate being sandwiched by the cathode and the anode, oxidizing gas and fuel gas being supplied to each cell element in the same direction in one cell element but in the direction opposite the gas flow of an adjacent cell element, passages for the oxidizing gas and the fuel gas being formed by projections provided on both faces of the separator plate, and the stack of the cathode and the anode defining a power generation part of the fuel cell, characterized in that preheating devices are proivded as a part of the fuel cell next to the power generation part in the direction of said gases flow, in a manner such that both incoming and outgoing gases pass thrugh the preheating devices and said preheating deivce comprises heat exchange promoting elements provided on both faces of the separator plate, such that the heat is transferred from the outgoing gases to the incoming gases.

2. A fuel cell according to claim 1, characterized in that said electrolyte plate is a molten carbonate-soaked porous plate.

3. A fuel cell according to claim 1, characterized in that said preheating devices are provided at both lateral sides of the power generation part, and each of said preheating devices comprises an insulator member and cover plates, the insulator member being sandwiched by the cover plates, and the insulator member of each preheating device is coplanarly connected with the electrolyte plate.

4. A fuel cell according to claim 3, characterized in that each cover plate has an aperture in which the anode or the cathode is fitted when the fuel cell elements are stacked.

5. A fuel cell according to claim 4, characterized in that bores which define oxidizing gas passages and fuel gas passages are formed in the preheating parts.

6. A fuel cell according to claim 4, characterized that bores which define oxidizing gas passages and fuel gas passages are formed in the preheating parts.

7. A fuel cell according to claim 6, characterized in that a plurality of heat exchange promoting elements are provided on both faces of the separator plate between the bores and the power generation part, that the pitch of the heat exchange promoting elements is smaller than that of the projections on the separator plate, and that the heat exchange promoting elements are spacedly arranged in a manner such that the gases flow dispersing.

8. A fuel cell according to claim 1, characterized in that the heat exchange promoting elements serve as spacer means between the separator plate and the cell element.

* * * * *